United States Patent [19]
Lee et al.

[11] Patent Number: 6,016,293
[45] Date of Patent: Jan. 18, 2000

[54] METHOD OF DISCRIMINATING DISCS HAVING DIFFERENT THICKNESS AND OPTICAL PICKUP DEVICE ADOPTING THE SAME

[75] Inventors: Chul-woo Lee, Seoul; Chong-sam Chung, Seongnam; Jang-hoon Yoo, Seoul, all of Rep. of Korea

[73] Assignee: Samsung Electronics Co. Ltd., Suwon, Rep. of Korea

[21] Appl. No.: 08/797,697

[22] Filed: Feb. 11, 1997

[30] Foreign Application Priority Data

Feb. 14, 1996 [KR] Rep. of Korea .......................... 96-3606

[51] Int. Cl.⁷ ........................................................ G11B 7/00
[52] U.S. Cl. .................................... 369/44.25; 369/44.41; 369/58
[58] Field of Search ................................. 369/44.12, 112, 369/44.41, 110, 44.42, 94, 58, 44.23, 44.25, 44.27; 365/47, 54, 59

[56] References Cited

U.S. PATENT DOCUMENTS

| | | | |
|---|---|---|---|
| 4,695,158 | 9/1987 | Kotaka et al. | 356/123 |
| 5,003,521 | 3/1991 | Yoshida et al. | 369/44.25 |
| 5,671,203 | 9/1997 | Ra | 369/58 |
| 5,684,773 | 11/1997 | Hayashi | 369/58 |
| 5,701,288 | 12/1997 | Seong | 369/112 |
| 5,708,638 | 1/1998 | Braat et al. | 369/58 |
| 5,710,749 | 1/1998 | Tsukai et al. | 369/58 |
| 5,724,325 | 3/1998 | Jeong | 369/58 |
| 5,734,637 | 3/1998 | Ootaki et al. | 369/58 |
| 5,748,597 | 5/1998 | Kim | 369/94 |
| 5,757,742 | 5/1998 | Akiba et al. | 369/58 |
| 5,757,744 | 5/1998 | Akkermans | 369/94 |
| 5,757,745 | 5/1998 | Takeya | 369/58 |
| 5,787,062 | 7/1998 | Mochizuki | 369/58 |
| 5,808,993 | 9/1998 | Lee | 369/58 |

FOREIGN PATENT DOCUMENTS

| | | |
|---|---|---|
| 0 492 844 A2 | 7/1992 | European Pat. Off. . |
| 0 610 055 A2 | 8/1994 | European Pat. Off. . |
| 33113784 A1 | 10/1983 | Germany . |
| 7-98431 | 4/1995 | Japan . |
| 2 304 226 | 3/1997 | United Kingdom . |
| WO 96 28816 | 9/1996 | WIPO . |

OTHER PUBLICATIONS

Patent Abstracts of Japan, vol. 017, No. 366 (P–1571) & JP 05 054406 (MATSUSHITA Electric Ind Co Ltd), Mar. 5, 1993.

Patent Abstracts of Japan, vol. 016, No. 323 (P–1386) & JP 04 095224 (MATSUSHITA Electric Ind Co Ltd), Mar. 27, 1992.

Patent Abstracts of Japan, vol. 095, No. 001, & JP 06 295467 (NIPPON Columbia co Ltd), Oct. 21, 1994.

*Primary Examiner*—Muhammad Edun
*Attorney, Agent, or Firm*—Staas & Halsey

[57] ABSTRACT

A disc discriminating method and an objective lens adopting the same, in which fast disc type discrimination and stable reproduction signal generation is performed. The method includes the steps of increasing and decreasing a focus voltage applied to an actuator of an objective lens facing a disc having an information-recorded plane to move the objective lens in a standby state at a neutral position to a focus position corresponding to the disc, detecting a movement distance value of the objectiveness from a focus signal applied to the actuator when the objective lens moves to the focus position, comparing the movement distance value with a reference value and determining the disc to be a thick disc if the movement distance value is greater than the reference value, and determining the disc to be a thin disc if the movement distance value is less than the reference value.

44 Claims, 8 Drawing Sheets

METHOD OF DISCRIMINATING DISCS HAVING DIFFERENT THICKNESS AND OPTICAL PICKUP DEVICE ADOPTING THE SAME

BACKGROUND OF THE INVENTION

The present invention relates to a method of discriminating discs having different thicknesses and an optical device adopting the same.

An optical pickup records and reproduces information such as video or audio data onto/from optical recording media, e.g., discs. The structure of a disc is such that a recorded surface is formed on a substrate made of plastic or glass. To read or write information from a high-density disc, the diameter of the optical spot must be very small. To this end, the numerical aperture (NA) of an objective lens is generally made large and a light source having a shorter wavelength is used. Using the shorter wavelength light source and large value of numerical aperture, however, reduces a tilt allowance of the disc with respect to an optical axis of the objective lens. The thus-reduced disc tilt allowance can be increased by reducing the thickness of the disc.

Assuming that the tilt angle of the disc is θ, the magnitude of a coma aberration coefficient $W_{31}$ can be obtained from:

$$W_{31} = -\frac{d}{2}\left(\frac{n^2(n^2-1)\sin\theta\cos\theta}{(n^2-\sin^2\theta)^{\frac{5}{2}}}\right)NA^3$$

where d and n represent the thickness and refractive index of the disc, respectively. As understood from the above relationship, the coma aberration coefficient is proportional to the cube of the numerical aperture. Therefore, considering that the numerical aperture of the objective lens required for a conventional compact disc is 0.45 and that for a digital video disc is 0.6, a digital video disc has a coma aberration coefficient of about 2.34 times that of a compact disc. The maximum tilt allowance of the digital video disc is therefore controlled to be reduced to about half that of the conventional compact disc. Accordingly, to assimilate the maximum tilt allowance of the digital video disc to that of the compact disc, the thickness of the digital video disc should be reduced.

However, such a thickness-reduced disc adopting a shorter wavelength (high density) light source, e.g., a digital video disc, cannot be used in a conventional recording/reproducing apparatus, e.g., a disc drive for the compact disc adopting a longer wavelength light source, because a disc having a non-standard thickness results in a spherical aberration corresponding to the difference in disc thickness from that of a normal disc. If the spherical aberration is greatly increased, the spot formed on the disc cannot have the light intensity necessary for recording, which prevents accurate recording of the information. Also, during reproduction, the signal-to-noise ratio is too low to reproduce the information accurately.

Therefore., an optical pickup adopting a light source having a short wavelength, e.g., 650 nm, which is compatible for discs having different thicknesses, such as a compact disc and a digital video disc, is necessary.

For this purpose, research into apparatuses using two discs having different thicknesses with a single optical pickup device adopting a shorter wavelength light source is underway. Lens devices respectively adopting a hologram lens and a refractive lens have been proposed (Japanese Patent Laid-open Publication No. hei 7-98431).

FIGS. 1 and 2 show the focusing of zero-order and first-order-diffracted light onto discs 3a and 3b having different thicknesses, respectively. A hologram lens 1, having lattice pattern 11, and a refractive objective lens 2 are provided along the light path in front of discs 3a (in FIG. 1) and 3b (in FIG. 2). The lattice pattern 11 diffracts light beams 4 from a light source (not shown) passing through the hologram lens 1, to thereby separate the passing light into first-order-diffracted light 41 and zero-order light 40 each of which is focused with a different intensity by the objective lens 2 for the appropriate focus point on the thicker disc 3b or the thinner disc 3a, and thus enable data read/write operations with respect to discs having different thicknesses.

However, in using such a lens device, the separation of the light into two: beams (i.e., the zero-order and first-order light) by the hologram lens 1 lowers the utilizing efficiency of the actually regenerated light to about 15%. Also, during a read operation, the information is included in only one of the two beams, and the beam carrying no information is likely to be detected as noise. Moreover, the fabrication of such a hologram lens requires a high-precision process for etching a fine hologram pattern, which increases manufacturing costs.

FIG. 3 is a schematic diagram of a conventional optical pickup device (U.S. Pat. No. 5,281,797) which, in lieu of using a hologram lens as above, includes an aperture diaphragm 1a for changing the aperture diameter, so that data can be recorded onto a longer wavelength disc as well as a shorter wavelength disc and so that information can be reproduced therefrom. The aperture diaphragm 1a 7330 is installed between the objective lens 2 and a collimating lens 5 and controls a light beam 4 emitted from a light source 9 and transmitted through a beam splitter 6, by appropriately adjusting the area of the light beam passing region, i.e., the numerical aperture. The diametrical aperture of the aperture diaphragm 1a is adjusted in accordance with the focused spot size and always passes the light beam 4a of the central region but passes or blocks the light beam 4b of the peripheral region in accordance with the adjusted state thereof. In FIG. 3, a reference numeral 7 denotes a focusing lens and reference numeral 8 denotes a photodetector.

In the optical device having the above configuration, if the variable diaphragm is a mechanical diaphragm, its structural resonance characteristics change depending on the diaphragm's effective aperture, and thus installation onto an actuator for driving the objective lens becomes difficult in practice. To solve this problem, liquid crystal may be used for forming the diaphragm. This, however, greatly impedes the miniaturization of the system, deteriorates heat-resistance and endurance, and increases the manufacturing costs.

Alternatively, a separate objective lens for each disc may be provided so that a specific objective lens is used for a specific disc. In this case, however, since a driving apparatus is needed for replacing lenses, the configuration becomes complex and the manufacturing costs increase accordingly.

The aforementioned optical pickup device has means for discriminating a disc for each thickness so that the corresponding circuit operates when a disc having a different thickness is inserted. This means discriminates a disc by a reproduction signal obtained from signals of all detecting elements of the photodetector. However, according to this means, the time necessary for discriminating a disc is long and an error in a disc discrimination may be generated.

SUMMARY OF THE INVENTION

It is an object of the present invention to provide a method of discriminating discs and an optical pickup device adopting the same, which can discriminate a disc type quickly and generate a stable reproduction signal.

To accomplish the above object, there is provided a method of discriminating discs according to the present invention comprising the steps of increasing and decreasing a focus voltage applied to an actuator of an objective lens facing a disc having an information-recorded plane, to move the objective lens in a standby state at a neutral position to a focus position corresponding to the disc; detecting a movement distance value of the objective lens from a focus signal applied to the actuator when the objective lens moves to the focus position; comparing the movement distance value with a reference value and determining the disc to be a thick (first thickness) disc if the movement distance value is greater than the reference value; and determining the disc to be a thin (second thickness) disc if the movement distance value is less than the reference value.

Also, according to another aspect of the present invention, there is provided an optical pickup device comprising an objective lens facing a disc; a photodetector for detecting an electrical signal from the light reflected from the disc; a focus error signal generator for generating a focus error signal from the electrical signal supplied from the photodetector; an actuator having a moving body to which a driving coil is attached to install the objective lens therein and a fixing body with a magnet corresponding to the driving coil to support the objective lens; an objective lens focus controller for supplying a focus voltage in response to the focus error signal to cause the actuator to move the objective lens to a focus position; a focus signal detector for detecting a focus signal corresponding to the focus position of the objective lens; and a disc discriminator for discriminating a disc type by comparing the focus signal with a reference signal.

Also, according to still another aspect of the present invention, there is provided an optical pickup device comprising an objective lens provided along a light path facing a disc from a light source and having a predetermined effective diameter; light controlling means provided along a light path facing the objective lens for controlling the light between near axis and far axis regions of an incident light; light splitting means provided between the light controlling light reflected from the disc and passing through the light splitting means; a focus error signal generator for generating a focus error signal from a signal supplied from the photodetector; an actuator having a moving body in which the objective lens is installed, a main body for supporting the moving body and supplying the movement space of the moving' body, and focus adjusting means for adjusting the focus distance of the objective lens with respect to the disc by adjusting the distance between the moving body and the main body; a focus controller for supplying an electrical focusing control signal for adjusting the focus position of the objective lens; a reproduction signal processor having first and second signal processors for obtaining at least two reproduction signals from the signal of the photodetector and processing the same; a position signal detector for detecting a position signal depending on the focus state of the objective lens; comparing means for comparing the position signal with a predetermined reference signal to determine a disc type; and switching means for applying the signal of the photodetector to one of the first and second signal processors according to the comparison result.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

In the present invention, the focus voltage applied to an actuator of an objective lens facing a disc having an information-recorded plane and placed in a disk drive is repeatedly increased or decreased a predetermined number of times, to move the objective lens to a focus position. When the objective lens is moved to the focus position, the movement distance value of the objective lens is detected from the focus voltage. In this case, the movement distance value is represented by either the voltage or current applied to the actuator, which is directly concerned with the position movement of the objective lens. If the movement distance value is greater than a reference value, a disc is determined to be a thick one. Otherwise, that is, if the movement distance value is less than the reference value, the disc is determined to be a thin one.

Figure 1:
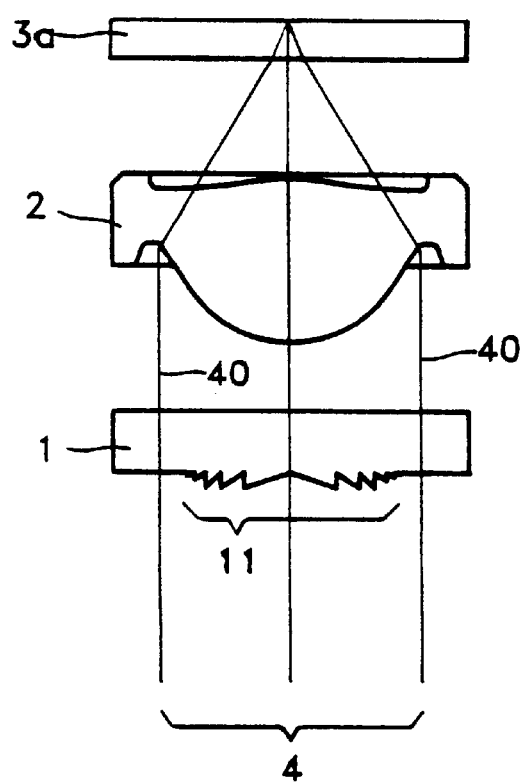
FIGS. 1 and 2 are schematic diagrams of a conventional optical pickup device having a hologram lens, showing the states where a light beam is focused onto a thin disc and a thick disc, respectively.
Figure 2:
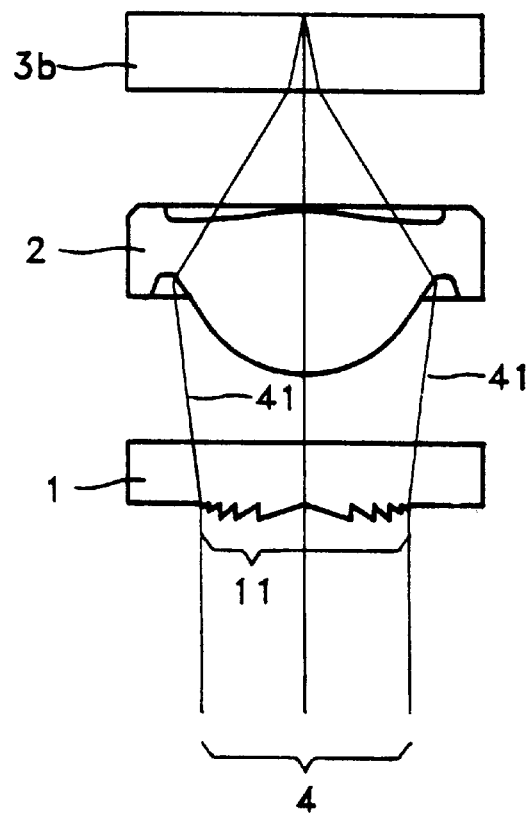
Figure 3:
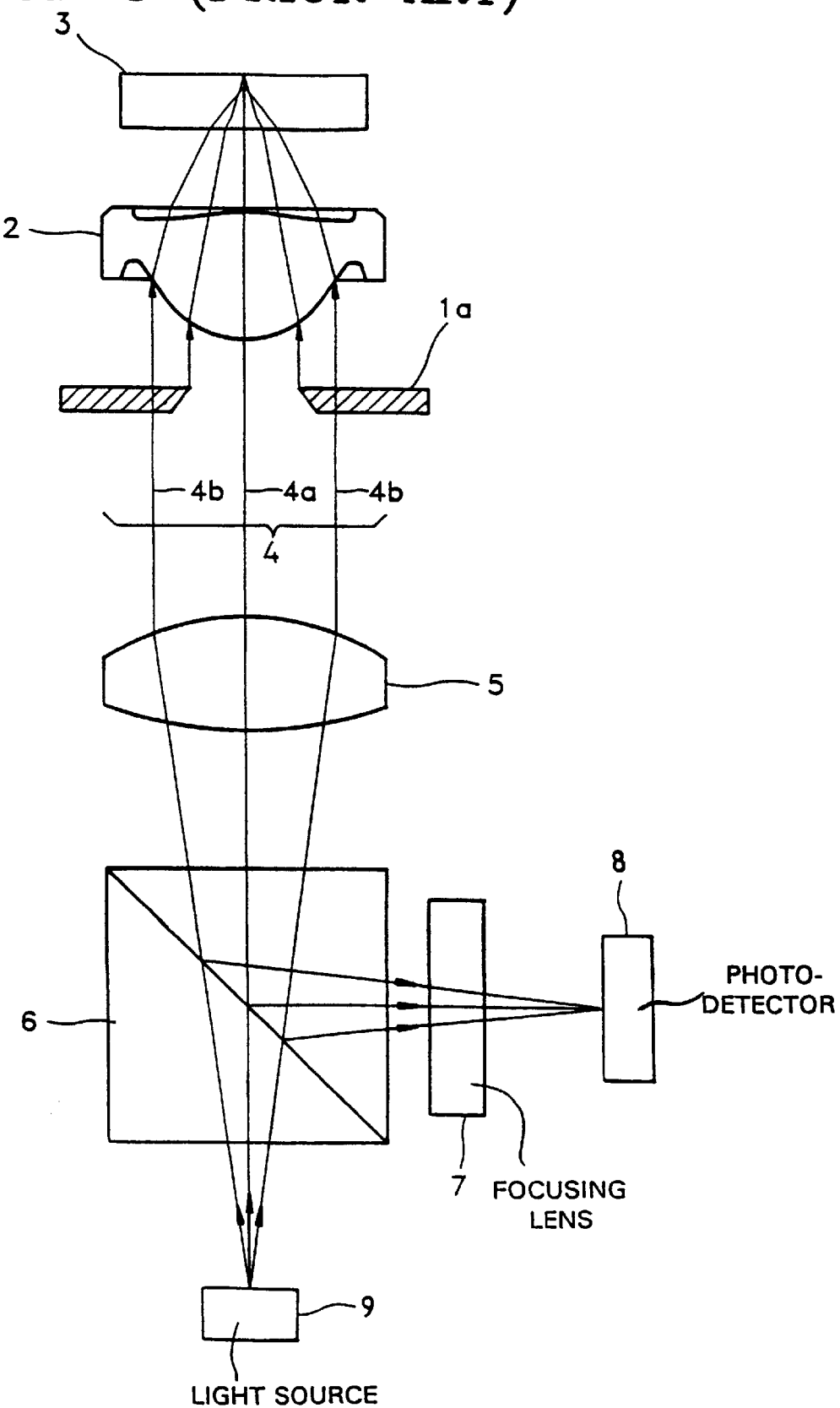
FIG. 3 is a schematic diagram of another conventional optical pickup device.
Figure 4:
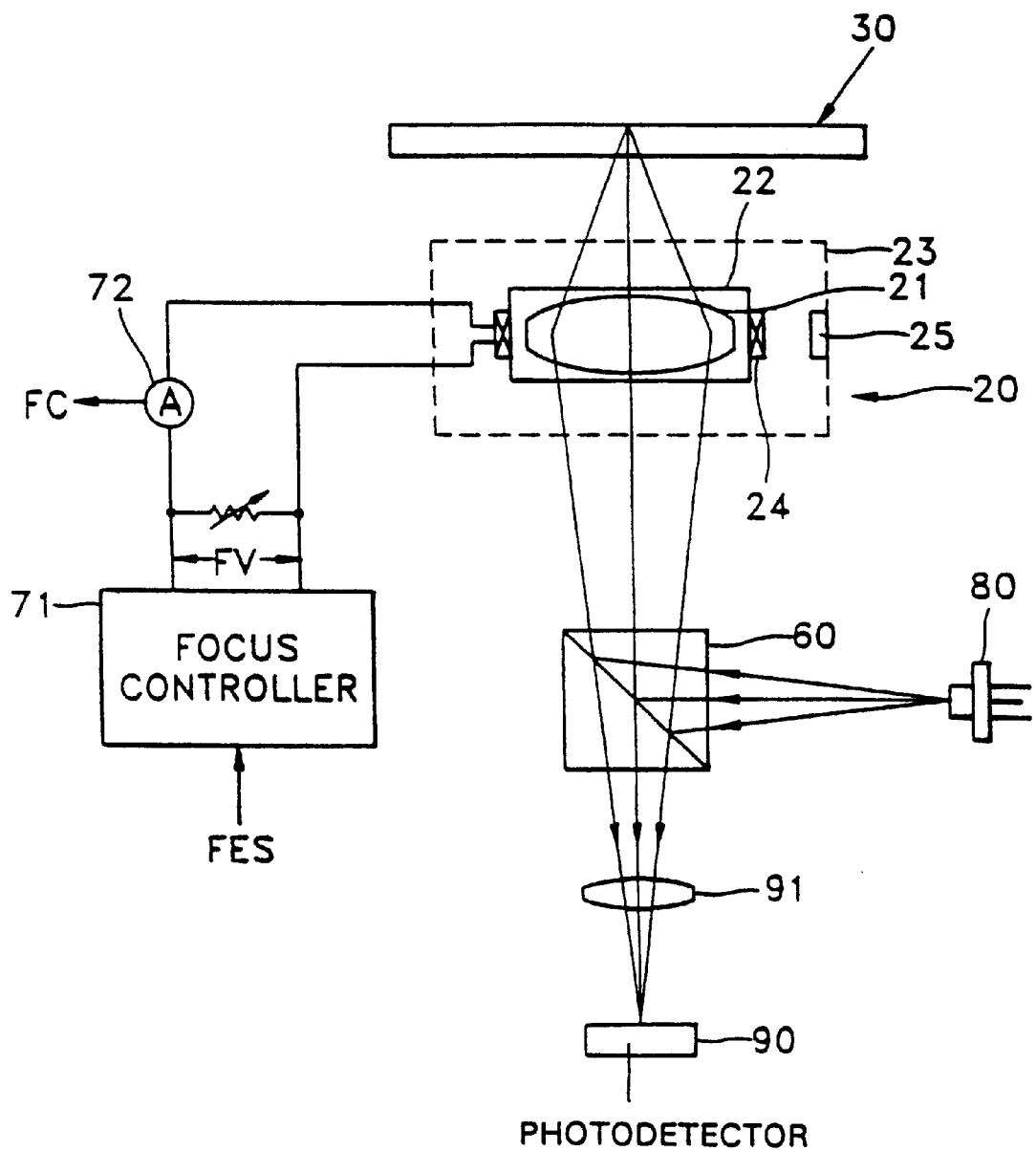
FIG. 4 is a schematic diagram of an optical pickup according to a first embodiment of the present invention.

FIG. 4 is a schematic diagram of an optical pickup device according to the present invention, to which the above-described method is performed.

An objective lens 21 is provided at a predetermined distance from a disc 36. The objective lens 21 is installed in a moving body 22 of an actuator 20. Like in the actuator of a general optical pickup device, a coil 24 constituting an electromagnet is attached to the moving body 22. A focus voltage is applied to the coil 24. The moving body 22 is installed within a fixing body 23. A fixing magnet 25 corresponding to the electromagnet 24 of the moving body 22 is installed in the fixing body 23. The objective lens 21 is provided along a first light path, a light splitter 60, a focusing lens 81, and a photodetector 90 are provided along the first light path, and a laser diode 80 is positioned along another light path divided from the light splitter 60.

In such a configuration, the photodetector 90 may be a 4-segmented or 8-segmented photodetector. The arrangement of the above-described optical elements may be varied according to the design or may be added thereto or removed therefrom.

A focus voltage FV supplied from a focus controller 71 is applied to the actuator 20. A focus error signal FES obtained by a general method is applied to the focus controller 71.

A position signal detector 72 for detecting a focus current FC depending on the adjustment of the focus position of the objective lens 21 is provided along the path through which the focus voltage FV is applied.

Figure 5:
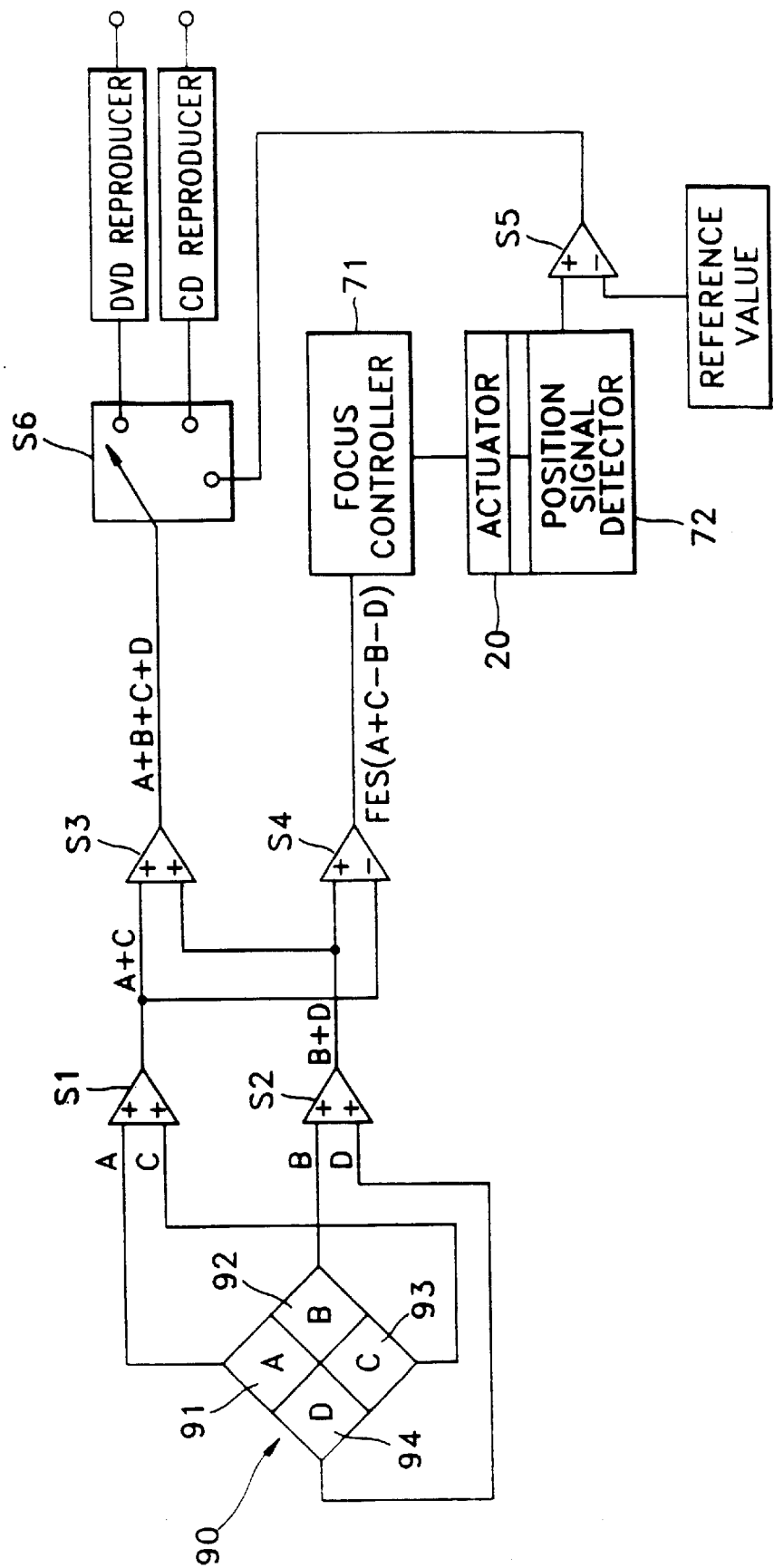
FIG. 5 shows a signal processing logic circuit for discriminating discs for the optical pickup device according to the present invention.

FIG. 5 is a block diagram of a reproduction and focus signal processor for obtaining a reproduction signal and a focus signal from a 4-segmented photodetector 90.

The photodetector 90 is a 4-segmented type having four detection elements 91, 92, 93 and 94. The signals A and C from the first and third elements 91 and 93 are summed by a first adder S1, and the signals B and D from the second and fourth elements 92 and 94 are summed by a second adder S2. Two sum signals A+C and B+D obtained from the first and second adders S1 and S2 are summed by a third adder S3 to then be output as a reproduction signal A+B+C+D. The reproduction signal is transmitted to a selection switch S6, to which a digital video disk signal reproducer and a compact disk signal reproducer are connected. The sum signals A+C and B+D are differentially amplified to then be output as the amplified focus error signal FES (A+C−B−D). The focus error signal FES is transmitted to the focus controller 71. The focus controller 71 drives the actuator 20 according to the focus error signal FES, that is, the moving body 22 having the objective lens 21 installed therein is moved, to move the objective lens 21 to a focus position. In this case, a signal depending on the position movement of the objective lens 21 is obtained by the position signal detector 72 and is then compared with a reference value by a comparator S5. If the signal value is larger than the reference value, the disc is determined to be a thick disc and then the selection switch S6 is operated so that the reproduction signal is applied to the compact disk reproducer. If the signal value is less than the reference value, the selection switch S6 is maintained at a normal state so that the reproduction signal is applied to the digital videodisk reproducer.

According to the aforementioned optical pickup device of the present invention, the objective lens 21 is focused by the focus error signal. When the objective lens 21 is focused, the position signal of the objective lens 21 is obtained and is then compared with a reference value to determine whether the objective lens 21 is moved by a distance exceeding the reference value, thereby discriminating the thickness of the disc.

Figure 6:
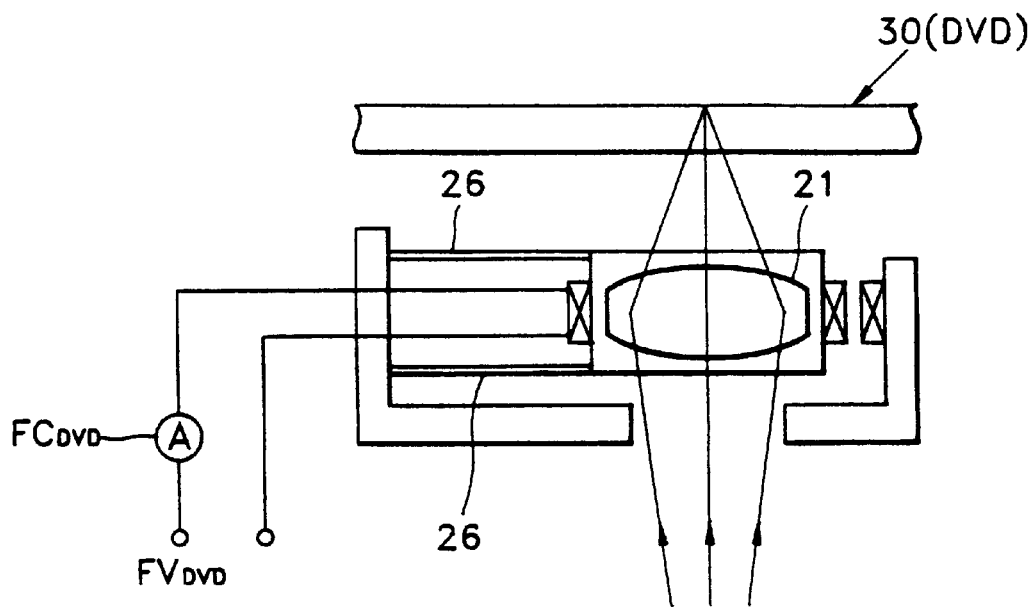
FIG. 6 is an extracted view showing the position of an objective lens with respect to a thin disc (digital video disk) in the optical pickup device according to the first embodiment of the present invention.
Figure 7:
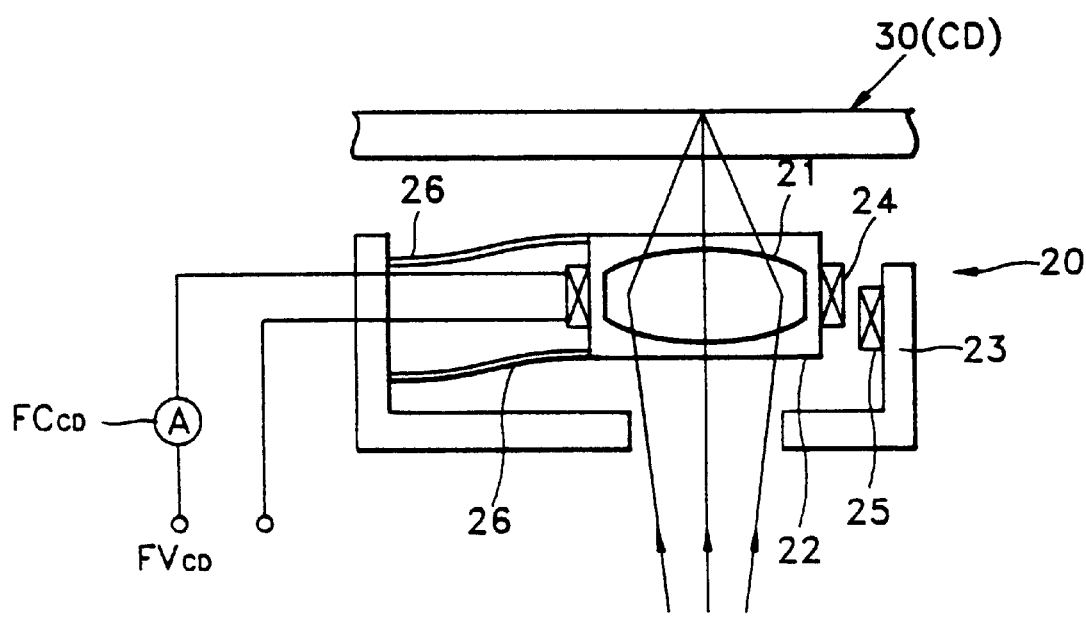
FIG. 7 is an extracted view showing the position of an objective lens relative to a thick disc (compact disk) in the optical pickup device according to the first embodiment of the present invention.

Generally, there is a difference of about 0.6 mm between the digital video disk and the compact disk in the light path length. However, in practice, there is a difference of about 0.4 mm therebetween in the operative distance of the objective lens 21. 409 In the optical pickup device according to the present invention, it is preferred that the neutral position of the objective lens 21 is maintained, that is, a predetermined neutral voltage ($FV_{DVD}$) is applied to the actuator 20 to maintain a suspension system 26, such as a spring, for supporting the moving body 22 of the actuator 20 in the most stable state, as shown in FIG. 6. Also, it is preferred to set the objective lens 21 to be positioned at the focus position with respect to the digital video disk. Here, in the case of using the compact disk, if the focus voltage ($FV_{CD}$) is applied to approach the objective lens 21 about 0.4 mm toward the disc, as shown in FIG. 7, information can be reproduced from the compact disk. Therefore, when the digital video disk and compact disk are used, the focus voltage difference ($FV_{CD-FVDVD}$) applied to the actuator 20 can be obtained. The practical movement distance of the objective lens 21 can be calculated from the difference. In other words, the calculation coefficient S obtained experimentally (i.e., sensitivity) is multiplied by the focus voltage difference to obtain the distance. The distance can be also obtained from the difference between the focus current ($FC_{DVD}$) in the case of using the digital video disk and the focus current ($FC_{CD}$) in the case of using the compact disk, as expressed in the following equations:

$$d = \frac{S(FV_{CD} - FV_{DVD})}{R}$$

$$d = \frac{S(FC_{CD} - FC_{DVD})}{R}$$

where S represents sensitivity, R represents resistance and d represents a movement distance from a reference position of the objective lens 21.

A reference for comparing the movement distance obtained by the above methods is necessary. Since the movement distance of the objective lens 21 is at most 0.4 mm, as described above, if the objective lens is moved by more than a half the maximum movement distance of the objective lens 21 from the neutral (reference) position, i.e., more than 0.2 mm, the disc is determined to be a compact disk. If the objective lens 21 is moved by less than 0.2 mm, the disc is determined to be a digital video disk. Thus, the comparison reference is the voltage or current when the objective lens 21 is moved by 0.2 mm.

Figure 8:
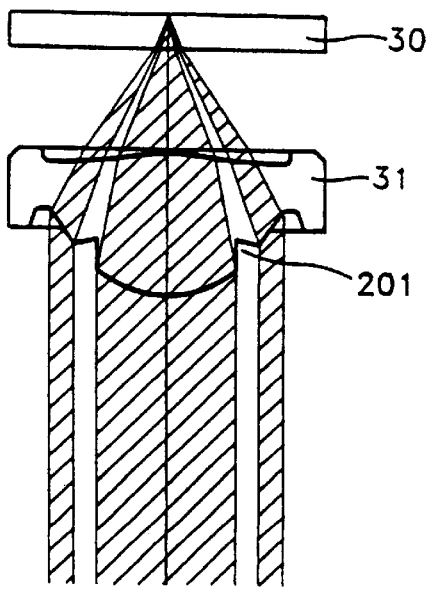
FIG. 8 is a schematic diagram of a new objective lens adopted to the optical pickup device according to a second embodiment of the present invention.

FIG. 8 shows an objective lens 31 used for the optical pickup device according to a second embodiment of the present invention. The objective lens 31 is provided with light controlling means 201 for controlling the light of an intermediate region between near and far axis regions of incident light beams. Here, the near axis region represents the region around the central axis of the lens (defined as an optical axis in the field of optics) having a substantially negligible aberration, the far axis region represents the region which is relatively farther from the optical axis than the near axis region, and the intermediate region is the region between the near axis region and the far axis region.

The light controlling means may be constructed to block or scatter the light of the region of an annular shape or a polygonal shape such as a square shape, having an outer diameter smaller than the effective diameter of the objective lens. Also, the light controlling means 201 may be a transparent member provided with a light controlling film of an annular shape or a polygonal shape such as a square shape. Further the light controlling film may be provided in one or two planes of the objective lens. The transparent member may be spaced by a predetermined distance from the objective lens 31.

Also, the light controlling means 21 may be a light controlling groove of a predetermined pattern formed in the light receiving plane of the objective lens 31 for scattering or reflecting the incident light. Particularly, it is preferred that the light controlling groove has an annular shape surrounding the near axis. Otherwise, the light controlling groove may have a polygonal shape such as a square shape.

Also, it is preferred that the light controlling groove is formed to be sloped by a predetermined angle, the bottom plane thereof not being perpendicular with respect to the light path, so that the incident light can be reflected in a direction not parallel with the light path.

Figure 9:
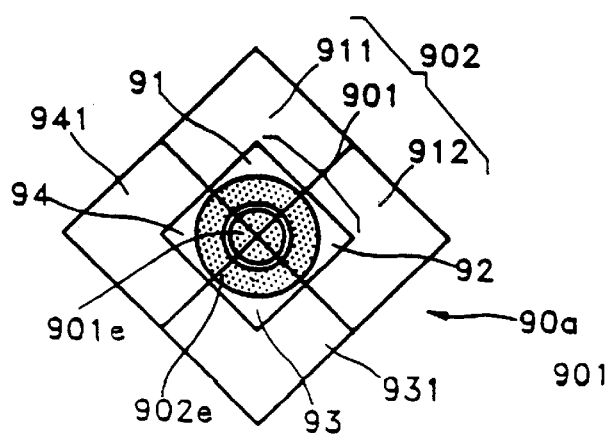
FIGS. 9 and 10 are plan views of a photodetector used for the optical pickup device according to the present invention with the objective lens shown in FIG. 8, showing light receiving states of the light reflected from a thin disc and a thick disc, respectively.
Figure 10:
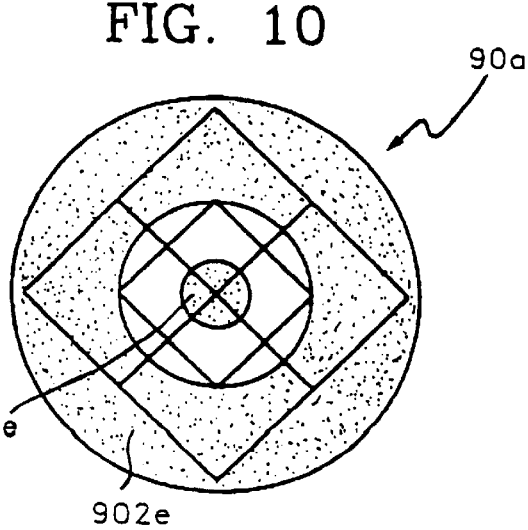
Figure 11:
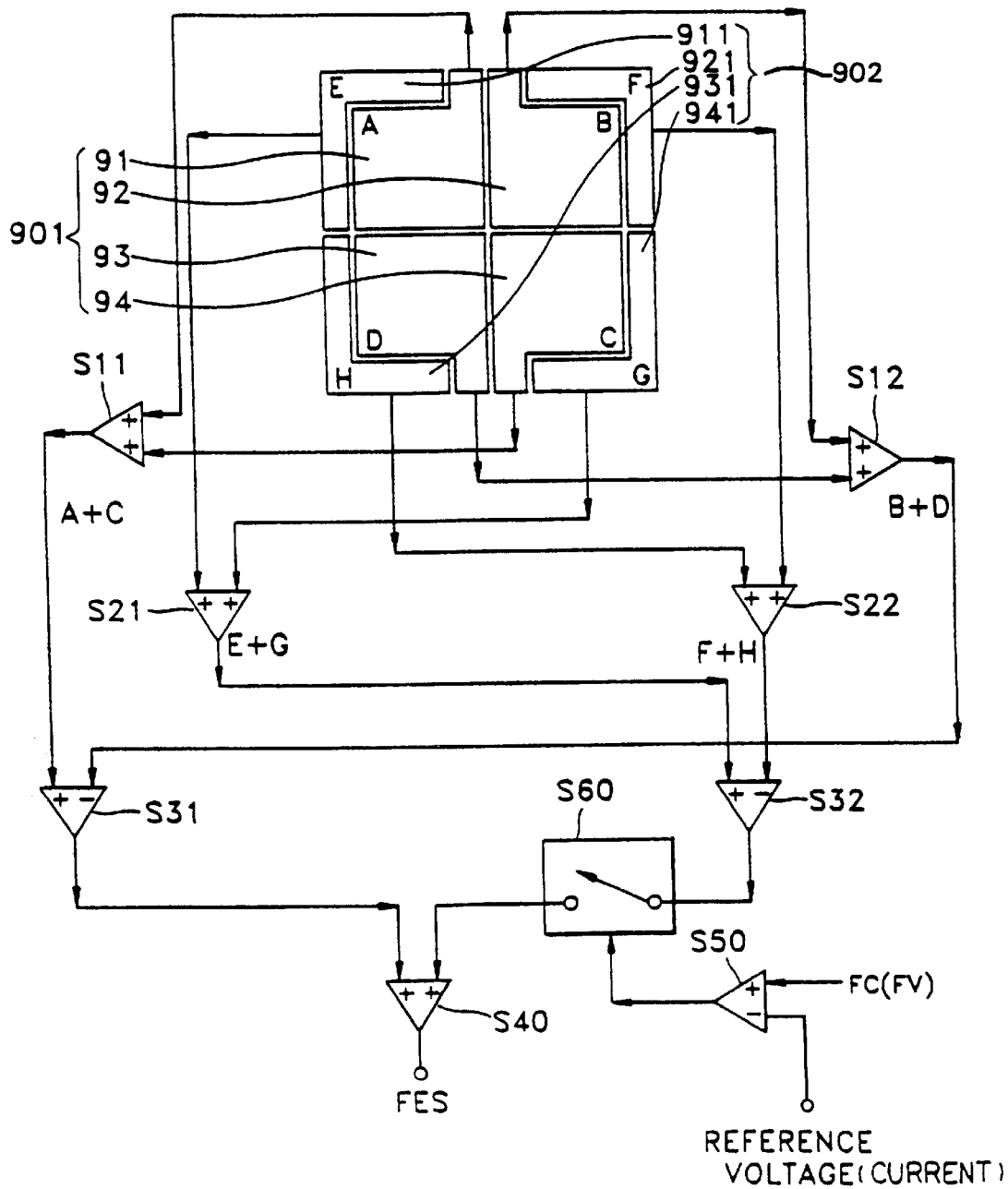
FIG. 11 is a circuit diagram of a focus error detector for the photodetector shown in FIGS. 9 and 10.

In the optical pickup device according to the second embodiment of the present invention, as shown in FIG. 9, a photodetector 90a is divided into a central region 901 having four elements 91, 92, 93 and 94 and a peripheral region 902 having four elements 911, 921, 931 and 941, surrounding the central region 901. In this case, it is preferred that the central region 901 has a light detection region of a size corresponding to the light 901e of the near axis region, reflected from the thick disc, as shown in FIG. 10, and corresponding to the light 901e, 902e of the near axis region and far axis region, reflected from the thin disc, as shown in FIG. 9. Then, when the thick disc is used, only the light of the near axis region is detected. When the thin disc is used, all of the light of the near and far axes regions are detected. Also, it is preferred that the peripheral region 902 receives the light of the region exceeding the near axis, i.e., the light of the far axis region, depending on the changed distance between the disc 30 and objective lens 31. Particularly, it is preferred that the central region of the photodetector 90a and the peripheral region surrounding the same are symmetrical up/down and left/right in terms of the overall structure. It is most preferred that each region is divided into four so as to be symmetrical up/down and left/right. FIG. 11 is a circuit diagram of a focus error signal detector in the optical pickup device adopting the improved objective lens and 8-segmented photodetector.

Two sets of adders S11 & S12 and S21 & S22 are connected to the central region 901 and the peripheral region 902, respectively. The respective adders are connected to two diagonally disposed elements of each region. The adders S11 & S12 and S21 & S22 of the central region 901 and peripheral region 902 are connected to differential amplifiers S31 and S32 for each region. The adders S11 and S12 of the central region 901 are directly connected to a focus error signal output adder through the differential amplifier S31, and the adders S21 and S22 of the peripheral region 902 are connected to the focus error signal output adder through the differential amplifier S32 via a switch S60. The switch S60 is operated by a comparator S50. The comparator S50 compares a given reference value, i.e., a reference voltage FV or reference current FC, with the focus voltage or current obtained from the actuator 20 to drive the switch S60 according to the comparison result, thereby determining whether the focus error signal from the peripheral region 902 is to be applied to adder S40.

As described above, according to the present invention, in the case of using the thin disc (digital video disk), since the switch S60 maintaining off-state, the focus error signal FES is generated only by the signal components from the central region 901. In the case of using the thick disc (compact disk), since the switch S60 is turned on, the focus error signal FES is generated by the signal components from both the central and peripheral regions 901 and 902.

Figure 12:
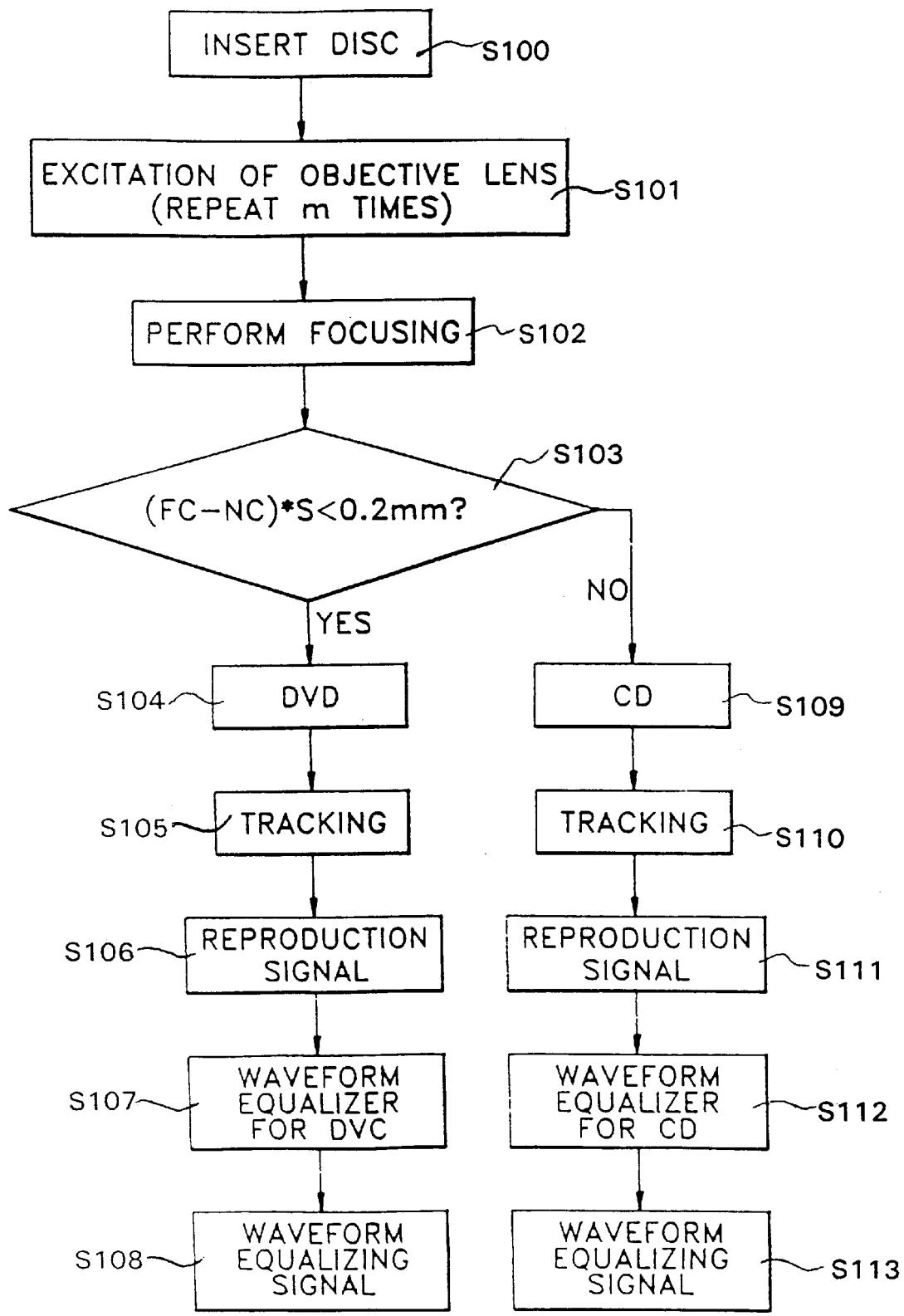
FIG. 12 sequentially shows a method of discriminating discs according to the first and second embodiments of the present invention.

FIG. 12 schematically shows the processes of discriminating discs by the aforementioned method and apparatus and then processing a reproduction signal, for example.

If a thin disc (digital video disk) or thick disc (compact disk) is inserted into a disk drive (not shown) as in step S100, the excitation range of an objective lens, i.e., focus current, is increased or decreased to discriminate the type of a disc, so that the objective lens is moved m times within its range of focus moving direction as in step S101, thereby obtaining an objective lens position signal from the actuator in the above-described manner. The repeated movement of the objective lens within its range of focus movement direction ensures a proper focus position determination. In this case, since a 4-segmented or an 8-segmented photodetector is used, the focus signal is obtained by an astigmatic method in step S102. It was experimentally understood that the light amount enough for the compatibility for both disc types could be obtained and a focus signal stabilization could be realized, under the condition that the amplitude of the focus signal for a thin disc reproduction is four times that for a thick disc reproduction.

In step S103, the focus voltage or current value corresponding to the objective lens position signal is compared with a neutral current (reference value) to determine whether the movement of the objective lens is less than 0.2 mm.

If the objective lens position signal is less than the reference value, the method proceeds to step S104, where it is determined that the disc is thin and focusing and tracking are continuously performed in step S105, thereby obtaining a reproduction signal in step S106. The reproduction signal passes through a waveform equalizer for a thin disc (digital video disk) in step S107 to obtain a waveform equalizing signal in step S108.

However, if the objective lens position signal is greater than the reference value, the method proceeds to step S109, where it is determined that the disc is thick and focusing and tracking are continuously performed in step S110, thereby obtaining a reproduction signal in step S111. The reproduction signal passes through a waveform equalizer in step S112 for a thick disc (compact disk) to obtain a waveform equalizing signal in step S113.

According to the method and apparatus of the present invention, the signal corresponding to the position of an objective lens is directly detected from an actuator and is compared with a reference value to discriminate a disc type. Therefore, the fast discrimination of a disc type is achieved and the generation of a stable reproduction signal is possible. Particularly, the disc discriminating method according to the present invention is suitable for a method and apparatus adopting an objective lens and corresponding eight-segmented photodetector having features of the present invention.

What is claimed is:

1. A method of discriminating discs having different thicknesses, comprising the steps of:

increasing and decreasing a focus voltage applied to an actuator of an objective lens facing a disc having an information-recorded plane, to move said objective lens in a standby state at a neutral position to a focus position corresponding to the disc;

detecting a movement distance value of said objective lens from a focus signal applied to said actuator when said objective lens moves to said focus position;

comparing said movement distance value with a reference value and determining the disc to be a first disc having a first thickness if said movement distance value is greater than said reference value; and determining the disc to be a second disc having a second thickness less than the first thickness if said movement distance value is less than said reference value.

2. An optical pickup device comprising:

an objective lens facing a disc;

a photodetector for detecting an electrical signal from light reflected from the disc;

a focus error signal generator for generating a focus error signal from said electrical signal supplied from said photodetector;

an actuator having
a moving body attached to a driving coil and to said objective lens, and
a fixing body with a magnet corresponding to said driving coil, to support said objective lens;
an objective lens focus controller for supplying a focus voltage in response to said focus error signal, to cause said actuator to move said objective lens to a focus position;
a focus signal detector for detecting a focus signal corresponding to the focus position of said objective lens; and
a disc discriminator for discriminating a disc type of the disc by comparing said focus signal with a reference signal.

3. An optical pickup device to radiate incident light beams onto a disc placed in a disk drive, comprising:
a light source to generate the incident light beams;
an objective lens provided along a light path of the incident light beams, and facing the disc;
light controlling means provided along the light path, for controlling the incident light beams of a central region between near axis and far axis regions of the incident light beams;
light splitting means provided between said light controlling means and light source;
a photodetector for detecting the light reflected from the disc and passing through said light splitting means, to generate a light detection signal;
a focus error signal generator for generating a focus error signal from the light detection signal supplied from said photodetector;
an actuator having
a moving body in which said objective lens is installed,
a main body for supporting said moving body and supplying a movement space of said moving body, and
focus adjusting means for adjusting the focus distance of said objective lens with respect to the disc by adjusting the distance between said moving body and main body;
a focus controller for supplying an electrical focusing control signal for adjusting the focus position of said objective lens in response to the focus error signal;
a reproduction signal processor having first and second signal processors for obtaining at least two reproduction signals from the light detection signal of said photodetector and processing the same;
a position signal detector for detecting a position signal for said objective lens depending on the focus state of said objective lens;
comparing means for comparing said position signal with a predetermined reference signal to determine a disc type; and
switching means for applying the light detection signal of said photodetector to one of said first and second signal processors according to the comparison result.

4. An optical pickup device as claimed in claim 3, wherein said light controlling means is formed in said objective lens.

5. An optical pickup device as claimed in claim 4, wherein said photodetector is an eight-segmented photodetector.

6. An optical pickup device as claimed in claim 3, wherein said photodetector is an eight-segmented photodetector.

7. A method of discriminating between disc types of discs of different thicknesses, comprising the steps of:

(a) determining a focus error signal for one of the discs which is placed in a disc drive;
(b) moving a focusing lens from a predetermined position to a focus position of the one disc in response to the focus error signal;
(c) determining a movement distance value indicative of an amount of movement of the focusing lens from the predetermined position to the focus position; and
(d) comparing the movement distance value with a reference value, and determining the disc type of the one disc based upon the comparison.

8. A method as claimed in claim 7, wherein said step (a) comprises further comprises the step of repeatedly moving the focusing lens throughout a range of motion in directions perpendicular to a plane of the one disc to determine the focus error signal.

9. A method as claimed in claim 8, wherein said step of repeatedly moving the focusing lens further comprises the step of applying varying focus voltages to an actuator connected to the focusing lens, to move the focusing lens in the directions perpendicular to the plane of the one disc.

10. A method as claimed in claim 7, wherein said step (d) further comprises the step of determining the one disc to have a first thickness if the determined movement distance value is greater than the reference value, and determining the one disc to have a second thickness less than the first thickness if the movement distance value is less than the reference value.

11. A method as claimed in claim 10, further comprising the steps of:
determining a reproduction signal from the one disc; and
processing the reproduction signal as compact disc information if the one disc is determined to have the first thickness and as digital video disc information if the one disc is determined to have the second thickness.

12. A method as claimed in claim 10, wherein said step (a) further comprises:
(a1) radiating incident light beams onto the one disc;
(a2) receiving reflected light beams from the one disc with a four-segment rectangular photodetector having the four segments symmetrically formed about two perpendicular axes;
(a3) summing a first pair of light signals from two of the four segments which are diagonally disposed from one another to generate a first sum, and summing a second pair of light signals from the other two of the four segments which are diagonally disposed from one another to generate a second sum; and
(a4) determining a difference between the first and second sums, to generate the focus error signal.

13. A method as claimed in claim 12, wherein:
said step (b) further comprises applying a focus voltage to an actuator connected to the focusing lens, to move the focusing lens in the directions perpendicular to the plane of the one disc to the focus position;
said step (c) further comprises using the focus voltage to determine the movement distance value to the focus position; and
said method further comprising the steps of
determining a reproduction signal from the one disc, and
processing the reproduction signal as compact disc information if the one disc is determined to have the first thickness and as digital video disc information if the one disc is determined to have the second thickness.

14. A method as claimed in claim 12, wherein:

said step (b) further comprises applying a focus voltage to an actuator connected to the focusing lens, to move the focusing lens in the directions perpendicular to the plane of the one disc to the focus position;

said step (c) further comprises determining a focus current used to control the actuator for moving the focusing lens to the focus position, to determine the movement distance value to the focus position; and said method further comprising the steps of
  determining a reproduction signal from the one disc, and
  processing the reproduction signal as compact disc information if, the one disc is determined to have the first thickness and as digital video disc information if the one disc is determined to have the second thickness.

15. A method as claimed in claim 10, wherein said step (a) further comprises (a1) radiating incident light beams onto the one disc;

(a2) receiving reflected light beams from the one disc with an eight-segment rectangular photodetector having four of the eight segments in a central region and symmetrically former about two perpendicular axes, and the other four segments in a peripheral region, surrounding the four segments of the central region and symmetrically formed about two perpendicular axes;

(a3) summing a first pair of light signals from two of the four segments of the central region which are diagonally disposed from one another to generate a first sum, and summing a second pair of light signals from the other two of the four segments of the central region which are diagonally disposed from one another to generate a second sum; and (a4) summing a third pair of light signals from two of the four segments of the peripheral region which are diagonally disposed from one another to generate a third sum, and summing a fourth pair of light signals from the other two of the four segments of the peripheral region which are diagonally disposed from one another to generate a fourth sum; and (a5) determining a first difference between the first and second sums, and determining a second difference between the third and fourth sums;

(a6) summing the first difference and the second difference if the one disc has the first thickness to generate the focus error signal, and using the first difference without the second difference if the one disc has the second thickness to generate the focus error signal.

16. A method as claimed in claim 15, further comprising controlling the incident light beams of an intermediate region, between near and far axis regions, wherein the near axis region is the region of the incident light beams which are incident on the focusing lens nearest an optical axis of the focusing lens, the far axis region is the region of the incident light beams which are incident on the focusing lens further from the optical axis than the near axis region, such that the incident light beams of the intermediate region do reach the one disc.

17. An optical pickup device to discriminate between disc types of discs of different thicknesses, comprising:

a focusing lens to focus incident light beams onto a plane of one of discs in a disc drive;

a focus error signal detector to generate a focus error signal for the one disc;

a control unit to move the focusing lens in directions perpendicular to the plane of the one disc, said control unit moving the focusing lens to a focus position based upon the focus error signal;

a disc discriminator to determine the disc type of the one disc based upon a movement distance value indicative of an amount of movement of the focusing lens to the focus position.

18. An optical pickup device as claimed in claim 17, wherein:

said focusing lens is an objective lens;

said control unit stably supports the objective lens in a predetermined position; and said disc discriminator determines the movement distance value indicative of the amount of movement of the objective lens from the predetermined position to the focus position, and compares the movement distance value with a reference value to determine the disc type.

19. An optical pickup device as claimed in claim 18, wherein said disc discriminator determines the one disc to have a first thickness if the movement distance value is greater than the reference value, and determines the one disc to have a second thickness less than the first thickness if the movement distance value is less than the reference value.

20. An optical pickup device as claimed in claim 19, wherein said control unit comprises:

a focus controller to generate a focus voltage in response to said focus error signal; and an actuator, connected to said objective lens, to support said objective lens and to move said objective lens from the predetermined position to the focus position in accordance with the focus voltage.

21. An optical pickup device as claimed in claim 20, wherein said actuator has a suspension system to stably support said objective lens at the predetermined position.

22. An optical pickup device as claimed in claim 21, wherein said focus controller generates a predetermined neutral voltage to induce said actuator to support said objective lens at the predetermined position, and said disc discriminator determines a difference between the focus voltage and the predetermined neutral voltage to determine the motion distance value.

23. An optical pickup device as claimed in claim 21, wherein said focus controller applies a predetermined voltage to said actuator to maintain said objective lens at the predetermined position.

24. An optical pickup as claimed in claim 23, wherein the one disc is a compact disk or a digital video disc.

25. An optical pickup device as claimed in claim 20, wherein said suspension system comprises a biasing unit.

26. An optical pickup device as claimed in claim 20, wherein said focus error signal detector comprises:

a photodetector to generate light detection signals in response to receiving light beams reflected from the one disc, wherein said photodetector includes four segments symmetrically formed about two perpendicular axes;

a first summer to sum a first pair of light signals from two of the four segments which are diagonally disposed from one another to generate a first sum;

a second summer to sum a second pair of light signals from the other two of the four segments which are diagonally disposed from one another to generate a second sum; and a subtracter to determine a difference between the first and second sums, to generate the focus error signal.

27. An optical pickup device as claimed in claim 26, further comprising:
- a reproduction signal generator including a third summer to determine a sum of the first and second sums, to generate a reproduction signal;
- a reproduction unit to reproduce the reproduction signal as compact disc information if the disc discriminator determines the one disc to have the first thickness and as digital video disc information if the disc discriminator determines the one disc to have the second thickness.

28. An optical pickup device as claimed in claim 20, wherein said focus error signal detector comprises:
- a photodetector to generate light detection signals in response to receiving light beams reflected from the done disc, wherein said photodetector includes eight segments, having four segments in a central region and symmetrically formed about two perpendicular axes, and the other four segments, in a peripheral region, surrounding the four segments of the central region and symmetrically formed about the two perpendicular axes;
- a first summer to sum a first pair of light signals from two of the four segments of the central region which are diagonally disposed from one another to generate a first sum;
- a second summer to sum a second pair of light signals from the other two of the four segments of the central region which are diagonally disposed from one another to generate a second sum;
- a third summer to sum a third pair of light signals from two of the four segments of the peripheral region which are diagonally disposed from one another to generate a third sum;
- a fourth summer to sum a fourth pair of light signals from the other two of the four segments of the peripheral region which are diagonally disposed from one another to generate a fourth sum;
- a first subtracter to determine a first difference between the first and second sums;
- a second subtracter to determine to a second difference between the third and fourth sums;
- a fifth summer to receive the first difference from the first subtracter; and
- a switch to enable selectively enable transmission of said second difference of said second subtracter to said fifth summer if said disc discriminator determines the one disc to have the first thickness;
- wherein the output of the fifth summer is used to determine the focus error signal.

29. An optical pickup device as claimed in claim 20, wherein said control unit further comprises a position signal detector to determine a focus current based upon the focus voltage, wherein said disc discriminator compares the focus current with the reference value to determine the disc type of the one disc.

30. An optical pickup device as claimed in claim 19, wherein said focus error signal detector comprises:
- a photodetector to generate light detection signals in response to receiving light beams reflected from the one disc, wherein said photodetector includes four segments symmetrically formed about two perpendicular axes;
- a first summer to sum a first pair of light signals from two of the four segments which are diagonally disposed from one another to generate a first sum;
- a second summer to sum a second pair of light signals from the other two of the four segments which are diagonally disposed from one another to generate a second sum; and
- a subtracter to determine a difference between the first and second sums, to generate the focus error signal.

31. An optical pickup device as claimed in claim 30, further comprising:
- a reproduction signal generator including a third summer to determine a sum of the first and second sums, to generate a reproduction signal;
- a reproduction unit to reproduce the reproduction signal as compact disc information if the disc discriminator determines the one disc to have the first thickness and as digital video disc information if the disc discriminator determines the one disc to have the second thickness.

32. An optical pickup device as claimed in claim 19, further comprising:
- a reproduction signal generator to generate a reproduction signal from the light reflected from the one disc;
- a reproduction unit to reproduce the reproduction signal as compact disc information if the disc discriminator determines the one disc to have the first thickness and as digital video disc information if the disc discriminator determines the one disc to have the second thickness.

33. An optical pickup device as claimed in claim 32, wherein said reproduction unit comprises:
- a digital video disc reproducer to reproduce the digital video disc information;
- a compact disc reproducer to reproduce the compact disc information;
- a selection switch to alternately enable transmission of the reproduction signal to the digital video disc reproducer and the compact disc reproducer based upon the determination of said discriminator as to whether the one disc has the second thickness or the first thickness, respectively.

34. An optical pickup device as claimed in claim 19, wherein said focus error signal detector comprises:
- a photodetector to generate light detection signals in response to receiving light beams reflected from the one disc, wherein said photodetector includes eight segments, having four segments in a central region and symmetrically formed about two perpendicular axes, and the other four segments in a peripheral region, surrounding the four segments of the central region and symmetrically formed about the two perpendicular axes;
- a first summer to sum a first pair of light signals from two of the four segments of the central region which are diagonally disposed from one another to generate a first sum;
- a second summer to sum a second pair of light signals from the other two of the four segments of the central region which are diagonally disposed from one another to generate a second sum;
- a third summer to sum a third pair of light signals from two of the four segments of the peripheral region which are diagonally disposed from one another to generate a third sum;
- a fourth summer to sum a fourth pair of light signals from the other two of the four segments of the peripheral region which are diagonally disposed from one another to generate a fourth sum;

a first subtracter to determine a first difference between the first and second sums;

a second subtracter to determine to a second difference between the third and fourth sums;

a fifth summer to receive the first difference from the first subtracter; and a switch to enable selectively enable transmission of said second difference of said second subtracter to said fifth summer if said disc discriminator determines the one disc to have the first thickness;

wherein they output of the fifth summer is used to determine the focus error signal.

35. An optical pickup device as claimed in claim 34, further comprising light controlling means provided to control the incident light beams of an intermediate region, between near and far axis regions, wherein the near axis region is the region of the incident light beams which are incident on said objective lens nearest an optical axis of said objective lens, the far axis region is the region of the incident light beams which are incident on said objective lens further from the optical axis than the near axis region, such that the incident light beams of the intermediate region do reach the one disc.

36. An optical pickup device as claimed in claim 35, wherein said light controlling means is a transparent member spaced apart from said objective lens and having a light controlling film formed thereon.

37. An optical pickup device as claimed in claim 36, wherein said light controlling film has an annular shape.

38. An optical pickup device as claimed in claim 36, wherein said light controlling film has a square shape.

39. An optical pickup device as claimed in claim 35, wherein said light controlling means is formed in at least one surface of said objective lens.

40. An optical pickup device as claimed in claim 39, wherein said light controlling means is a light controlling groove of a predetermined pattern formed in a light receiving plane of said objective lens.

41. An optical pickup device as claimed in claim 40, wherein said light controlling groove is sloped by a predetermined angle, wherein a bottom surface is not perpendicular to a light path of said incident light beams.

42. An optical pickup device as claimed in claim 19, wherein said control unit repeatedly moves said objective lens in a movable range thereof to determine the focus error signal.

43. An optical pickup device as claimed in claim 19, wherein the predetermined position is a focus position for a digital video disk, a movable focus range of said objective lens is approximately 0.4 mm, and when said motion distance value is indicative of motion of the objective lens at least approximately 0.2 mm toward the one disc, said disc discriminator determines the one disc to be a compact disc, otherwise said disc discriminator determines the one disc to be the digital video disk.

44. An optical pickup device as claimed in claim 18, wherein the predetermined position is a focus position for a digital video disk, a movable focus range of said objective lens is approximately 0.4 mm, and when said motion distance value is indicative of motion of the objective lens at least approximately 0.2 mm toward the one disc, said disc discriminator determines the one disc to be a compact disc, otherwise said disc discriminator determines the one disc to be the digital video disk.

* * * * *

UNITED STATES PATENT AND TRADEMARK OFFICE
CERTIFICATE OF CORRECTION

PATENT NO.: 6,016,293
DATED : January 18, 2000
INVENTOR(S): Chul-woo LEE et al.

It is certified that error appears in the above-identified patent and that said Letters Patent is hereby corrected as shown below:

Title Page, Item [54], change "THICKNESS" to --THICKNESSES--;

Column 11, line 15, delete ",";

Column 11, line 20, insert ":" after "comprises";

Column 13, line 16, change "done" to --one--.

Signed and Sealed this

Third Day of April, 2001

Attest:

NICHOLAS P. GODICI

Attesting Officer

Acting Director of the United States Patent and Trademark Office